United States Patent [19]

Sakagami

[11] Patent Number: 4,868,806
[45] Date of Patent: Sep. 19, 1989

[54] AN INFORMATION RECORDING APPARATUS FOR RECORDING A DIRECTORY INFORMATION UNIT ON A SINGLE RECORDING TRACK OF A RECORDING MEDIUM BASED ON THE NUMBER OF DIRECTORY INFORMATION UNITS PREVIOUSLY RECORDED IN THE SINGLE RECORDING TRACK

[75] Inventor: Wataru Sakagami, Yokohama, Japan

[73] Assignee: Canon Kabushiki Kaisha, Tokyo, Japan

[21]* Appl. No.: 64,246

[22] Filed: Jun. 19, 1987

[30] Foreign Application Priority Data

Jun. 23, 1986 [JP] Japan ................................ 61-147800

[51] Int. Cl.⁴ .............................................. G11B 5/76
[52] U.S. Cl. ........................................ 369/58; 360/48; 360/72.1; 235/454; 235/470; 235/494
[58] Field of Search ....................... 369/32, 33, 44, 53, 369/54, 58, 59; 360/27, 48, 72.1, 72.2; 235/454, 470, 494

[56] References Cited

U.S. PATENT DOCUMENTS 4,682,318 7/1987 Busby ..................................... 369/59

Primary Examiner—Robert L. Richardson
Attorney, Agent, or Firm—Fitzpatrick, Cella, Harper & Scinto

[57] ABSTRACT

An information recording apparatus comprises: a recorder to record information into a recording medium such as an optical card having a plurality of information recording tracks; a generator to generate management information, i.e., directory to manage the information to be recorded into the card; and a controller for allowing a plurality of directories to be recorded into one of the information recording tracks, wherein when the controller additionally records a directory, it controls the recording position of the directory on the basis of the number concerned with the directories recorded in one track. The controller counts the number of directories or the number of gaps among the directories recorded in one track. When the count value is less than a predetermined number, the controller additionally records a new directory into the track. With this apparatus, the directories can be managed by a simple constitution without adding addresses to the recorded information, respectively.

12 Claims, 9 Drawing Sheets

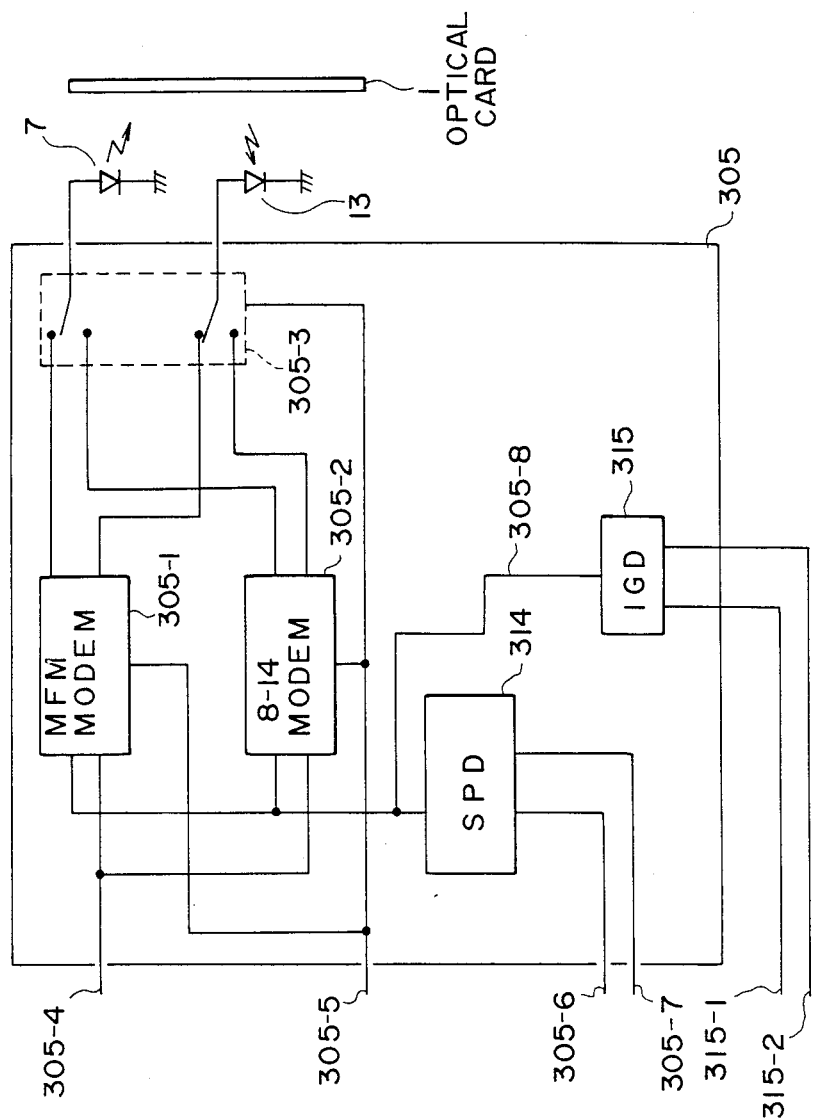

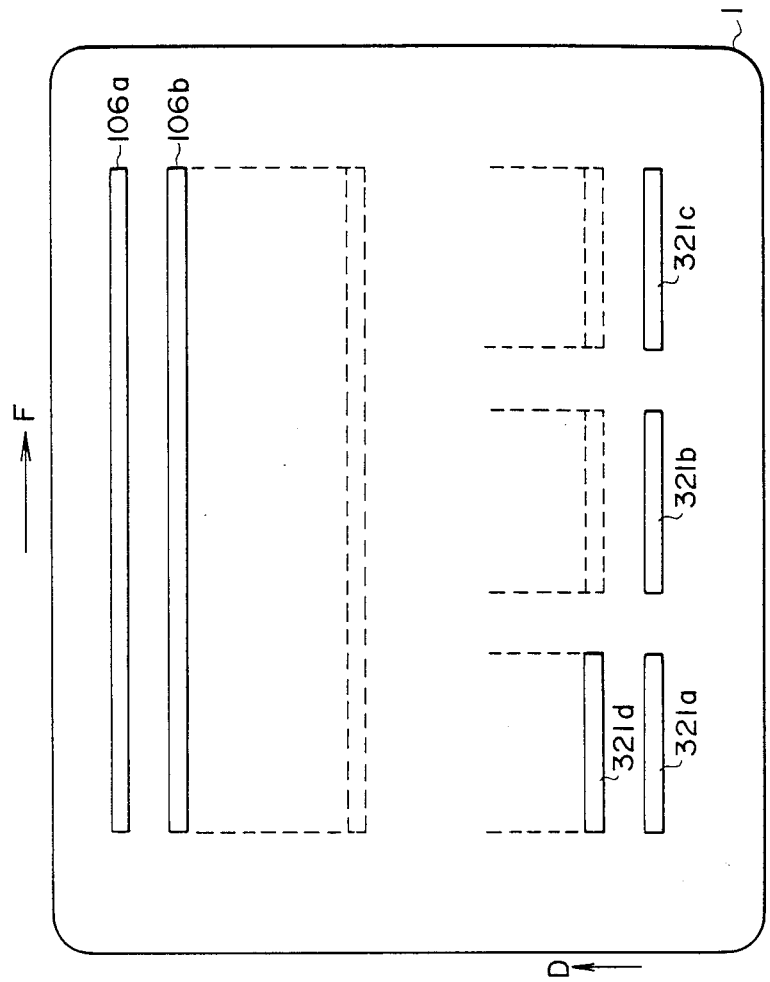

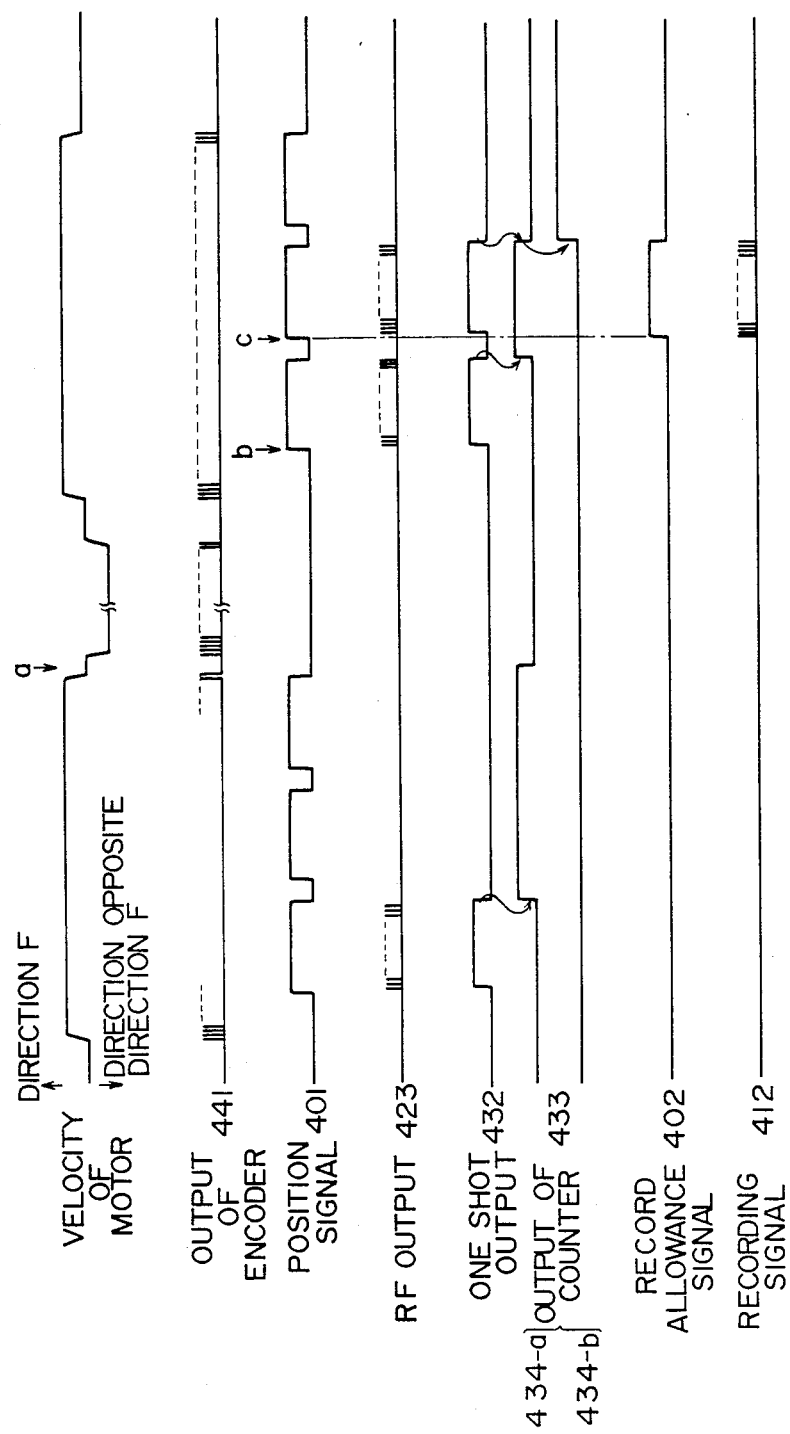

AN INFORMATION RECORDING APPARATUS FOR RECORDING A DIRECTORY INFORMATION UNIT ON A SINGLE RECORDING TRACK OF A RECORDING MEDIUM BASED ON THE NUMBER OF DIRECTORY INFORMATION UNITS PREVIOUSLY RECORDED IN THE SINGLE RECORDING TRACK

BACKGROUND OF THE INVENTION

1. Field of the Invention

The present invention relates to an information recording and reproducing apparatus.

2. Related Background Art

Hitherto, as a form of medium in which information is recorded using a light, various kinds of disk-shaped medium, card-shaped medium, and the like have been known. Among them, a card-shaped optical information recording medium (hereinafter, referred to as an optical card) is a small-sized and light-weighted portable medium having a large recording capacity; therefore, a large demand of this medium is expected.

In the above optical card, a recording signal is modulated in accordance with recording information, a laser beam focused to a microspot scans the optical card, thereby enabling information to be recorded as a recording pit train which can be optically detected.

As an apparatus for recording and reproducing information into/from a card in this manner, an apparatus disclosed in U.S. patent application No. 810,747 has been applied.

An optical recording and reproducing medium (hereinafter, referred to as an optical card), in particular, an unerasable write-once type optical card has dimensions corresponding to a credit card size and has a large memory capacity. The dimensions of such a card are about 85 mm×55 mm. Now, assuming that an information track pitch is 20 μm and a recording length of one bit is 5 μm, number of tracks = 55 mm × (1000 ÷ 20) = 2750, bit capacity/track = 85 × (1000 ÷ 5) = 17000 bits, byte capacity/track = 17000 ÷ 8 ≈ 2000 bytes.

Therefore, the whole data capacity is

2750 × 2000 = 5,500,000 = 5.5 MB.

In order to manage information of such a large capacity, it is necessary to take a measure to manage recording information by directories similarly to a floppy disk. A directory is information indicating at which position which data is recorded. However, in the case of a write-once type recording medium in which information is recorded in a single direction for the arranging direction of tracks, directory information is hidden between data tracks, so that it is difficult to extract only a directory.

Moreover, in the case of forming information tracks by reciprocating a card, there is a problem such that it is difficult to control. Therefore, it is hard to provide a plurality of independent information recording sections for a single track.

To eliminate the foregoing drawbacks, in Japanese Patent Application No. 121453/1985, there has been disclosed a method whereby directory information and data to be recorded are separately recorded from a track having a small track number and from a track having a large track number. However, in this method, since a directory area in one track is not divisionally managed, there is a fear such that it is difficult to search an unrecorded area when a directory is written.

SUMMARY OF THE INVENTION

It is an object of the present invention to provide an information recording and reproducing apparatus which can eliminate the foregoing drawbacks.

Another object of the invention is to provide an improved information recording and reproducing apparatus.

Still another object of the invention is to provide an information recording apparatus which can write a directory into one track of a recording medium by a simple constitution.

Still another object of the invention is to provide an information recording apparatus which can manage directories by a simple constitution.

The above and other objects and features of the present invention will become apparent from the following detailed description and the appended claims with reference to the accompanying drawings.

BRIEF DESCRIPTION OF THE DRAWINGS

FIG. 2 is a block diagram showing a constitution of a modulator-demodulator circuit;

FIG. 3 is a diagram showing an outline of a recording format of an optical card;

FIG. 8 is a time chart of each signal shown in FIG. 7.

DETAILED DESCRIPTION OF A PREFERRED EMBODIMENT

An embodiment of the present invention will be described in detail hereinbelow with reference to the drawings.

Figure 1A:
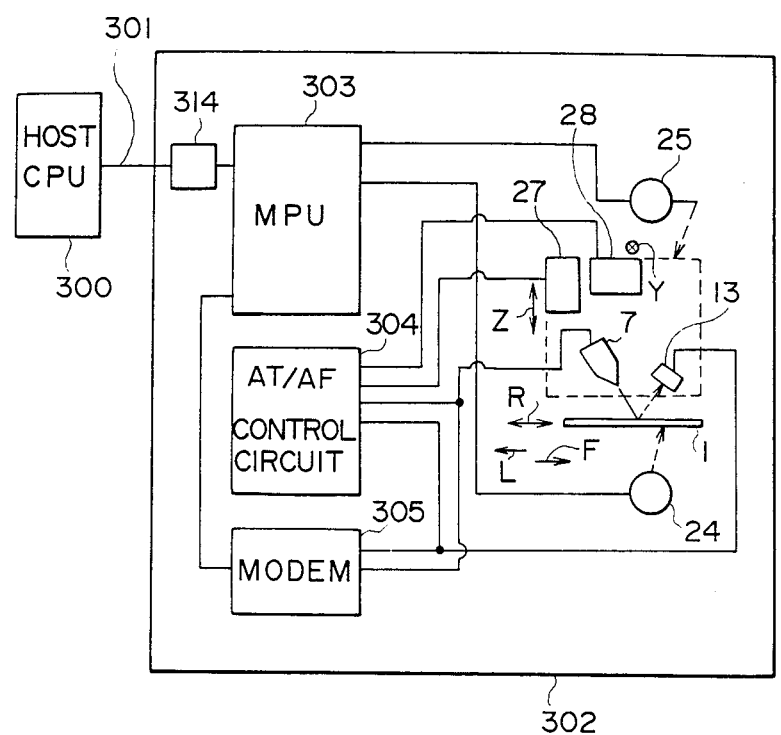
FIGS. 1A and 1B are block diagrams showing a constitution of an information recording and reproducing apparatus.
Figure 1B:
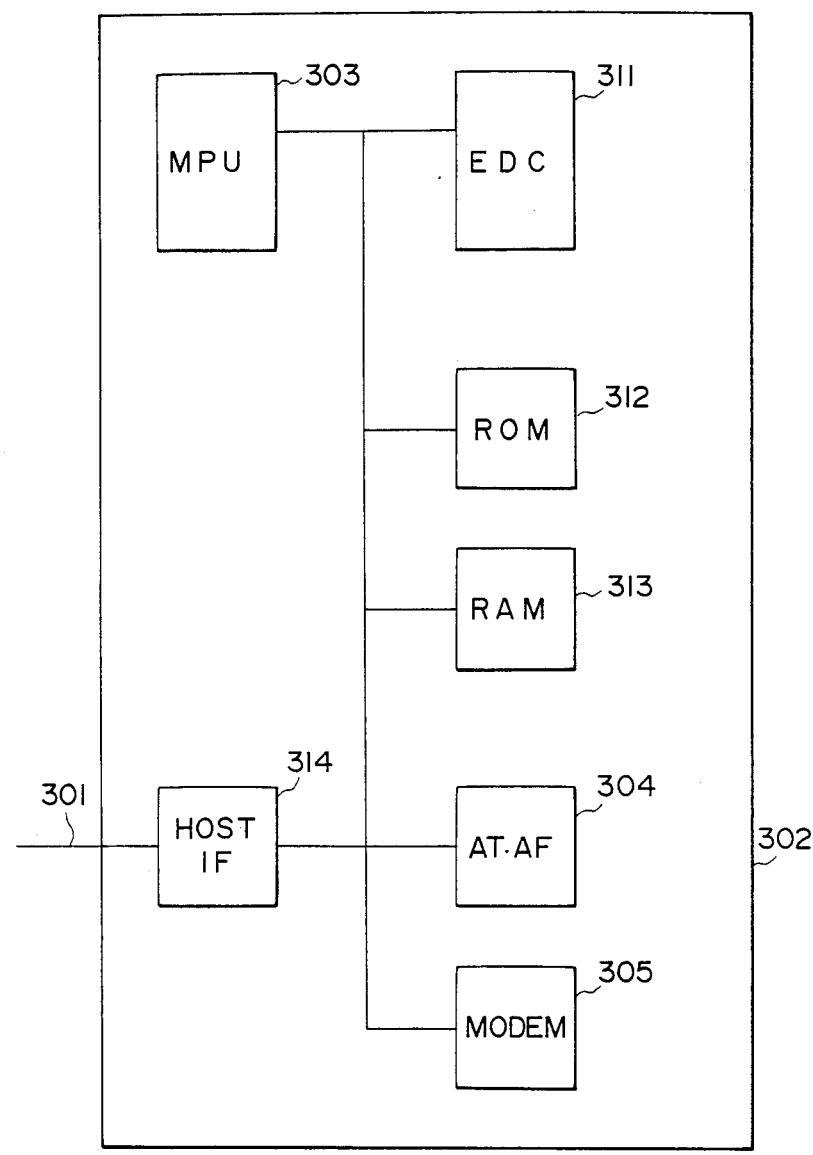
Figure 4:
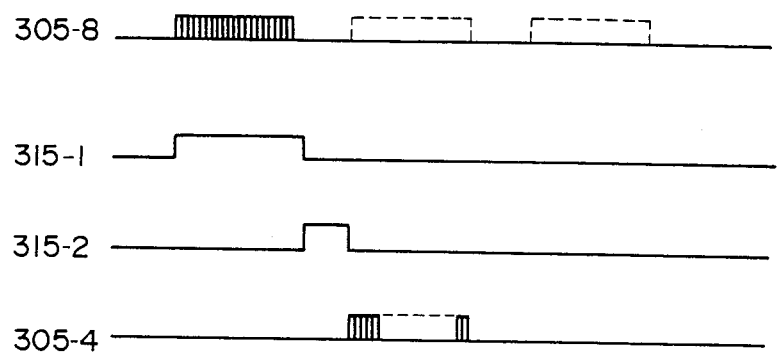
FIG. 4 is a time chart showing a signal when a directory is recorded.

FIGS. 1A and 1B are block diagrams showing a constitution of an optical information recording and reproducing apparatus using an optical card.

An information recording and reproducing apparatus (hereinafter, referred to as a drive) 302 is connected to a host control unit (hereinafter, referred to as a host CPU) 300 and performs communication of data between the drive 302 and the host CPU 300 through an interface 314, control, and the like. An MPU 303 in the drive 302 includes an ROM 312 and an RAM 313 and mainly controls a card feed motor 24 and a head feed motor 25. A control program and control data are stored in the ROM 312. An AT/AF (auto tracking/auto focusing) control circuit 304 receives a signal from a photo detector 13 and drives an AF actuator 27 and an AT actuator 28. A modulator-demodulator circuit (hereinafter, referred to as an MODEM) 305 changes a light emission intensity of a light source 7 in the recording mode, thereby allowing the recording operation to be executed. The MODEM 305 demodulates data in the (step 9). In place of detecting the number of pulses in signal 315-1, the number of pulses in signal 315-2 may be also detected.

As described above, the number of directories or gaps is detected before a new directory is written and if the number of directories or gaps detected coincides with the stored number in the writing mode, the writing operation is started. In this manner, a directory can be certainly written.

Further, after a new directory was written, the written directory is read out and an error check is performed. After completion of the error check, if an error has been detected, by again recording the directory in the next directory section, the reliability of the directory data can be improved.

The operation when an error has been detected and the moving position of a laser beam will now be explained with reference to Fig. 6. At first, the laser beam is located at point H and progresses in the directions indicated by arrows. (A) : The number of gaps is counted. (B) : The laser beam is returned to the point H. (C) : When the laser beam has reached the position at 312e, the directory is recorded as 321e. (D) : An error of the directory 321e is checked. If an error has been detected, (E) : the directory is again written at the position of 321e'. (F) : An error of the directory 321e' is checked.

The above operations will now be further described in detail.

An embodiment using a encoder synchronized with the card feeding operation will be described with reference to FIGS. 7 and 8. FIG. 7 shows a partial detailed diagram of FIG. 1B. An LSI (PPI) 400 to control peripheral terminals is connected to the MPU 303. A motor control circuit 451 is connected to the PPI 400. An encoder output signal 441 from an encoder 440 attached to a motor 450, a counter output 434 of a counter 433, and a signal 435 to reset the counter 433 are also connected to the PPI 400. Further, a recording circuit 410 to control data for recording data from the RAM 313 into the card 1 is connected to the MPU 303. The recording circuit 410 comprises: a parallel/serial converter (PSCONV) 411 to convert parallel data into serial data and a modulator 413. A reproducing circuit 420 to reproduce the data recorded in the card is also connected to the MPU 303. The reproducing circuit 420 comprises: a demodulator 421 to demodulate the signal from the photo detector; and a serial/parallel converter (SPCONV) 422 to convert the serial data into the parallel data. A gap detecting circuit (IGD) 430 comprises: a one-shot multivibrator 431; and a counter 433 to count the output of the one-shot multivibrator 431. FIG. 8 is a timing chart showing a signal of each section in FIG. 7. An explanation will now be made hereinbelow with respect to the case where a directory is written into the track in which on directory shown in FIGS. 3 and 6 has already been recorded.

When the card is fed in the F direction, the encoder output signal 441 is counted. When the count value falls within a range of 500 to 2000, 2500 to 4000, or 4500 to 6000, a signal 401 shown in FIG. 8 is changed and set to "1" in this case.

Figure 6:
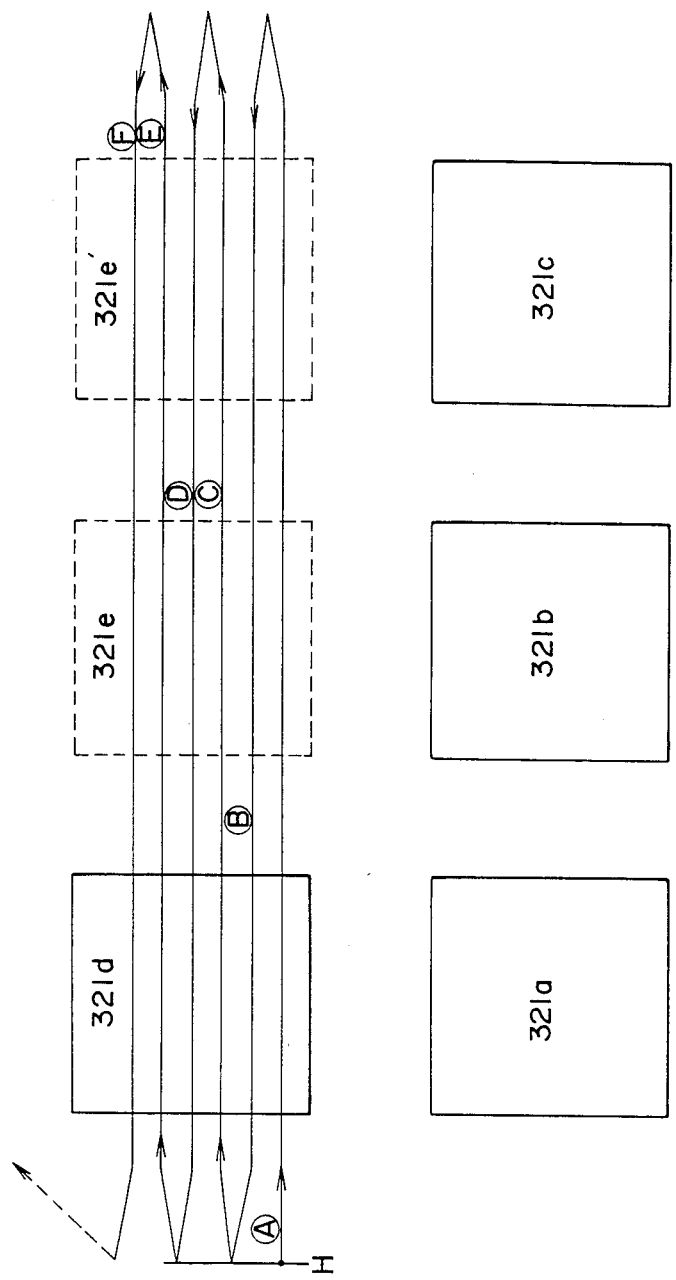
FIG. 6 is a diagram showing a motion of an optical head when directory is recorded.
Figure 7:
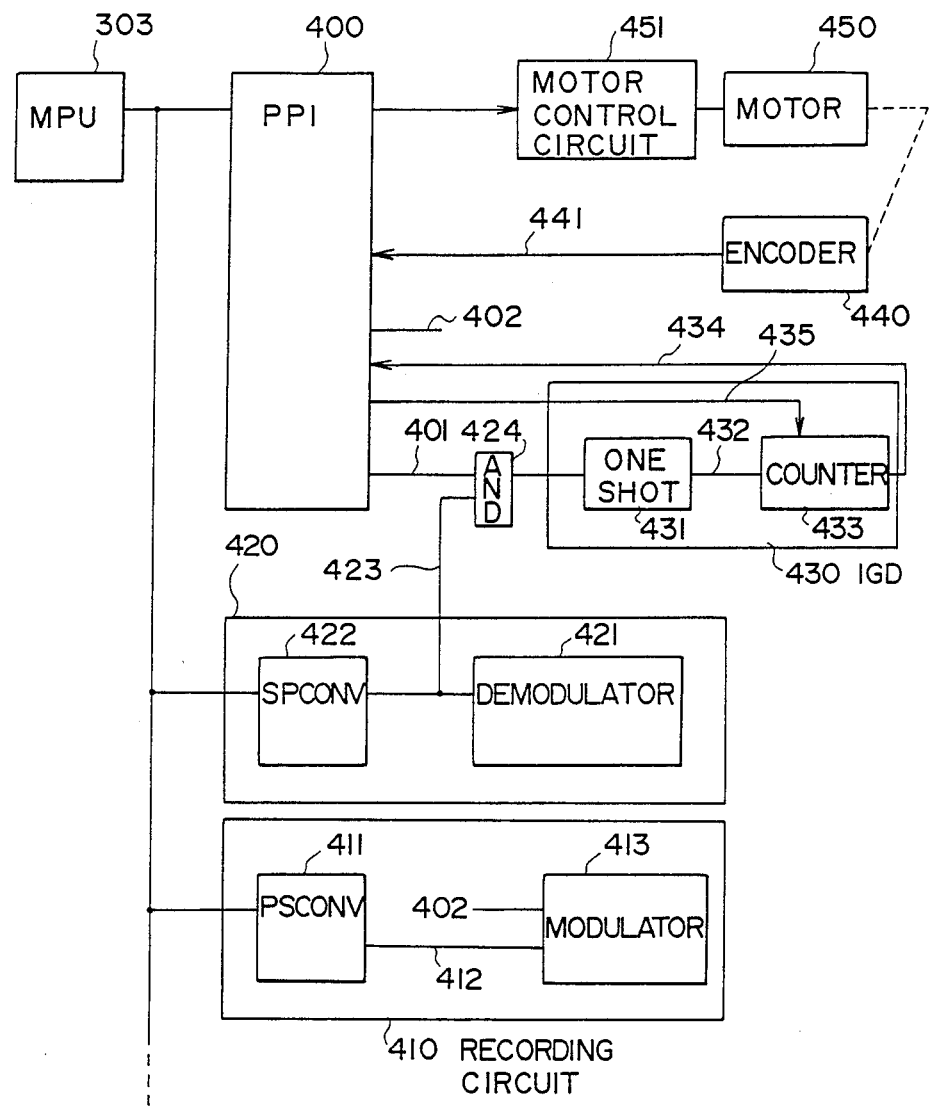
FIG. 7 is a detailed diagram showing a part of FIG. 1B.

When the laser spot is located at the point H in FIG. 6, if the card is fed in the F direction, the encorder output signal 441 is output. Therefore, the MPU 303 counts this output and generates as the signal 401 for a predetermined period of time. The information recorded in the card 1 is demodulated by the demodulator 421 as an RF output signal 423. Only when the signal 401 is set to "1", the RF output signal 423 is used as trigger signal of the one-shot multivibrator 431 by AND gate 424. Since the one-shot multivibrator 431 can be retriggered, a one shot output signal 432 has a form such that the intermittent RF output signal 423 was integrated. The counter 433 counts up in response to the trailing edge of the one shot output signal 432. Namely, in the example of FIG. 6, since only a single directory (321d) is recorded, the RF output signal 423 is output when the laser spot scans the directory 321d. When the motor is stopped (point a in FIG. 8), only a single one shot output signal 432 is output, so that the count value of the counter 433 is 1. The MPU 303 stores the count value of the counter 433 as a previous count value and at the same time, the MPU 303 outputs a counter reset signal 435 to thereby reset the counter 433. The number of directories recorded in the present track is specified by the above operation. Subsequently, the MPU 303 feeds the card in the direction opposite to the F direction and returns the laser spot to the point H in FIG. 6.

The card is then fed in the F direction and the writing operation is started. In the writing operation, the content of the counter 433 is read out at the timing when the signal 401 was set to "1" and compared with the previous count value. No process is performed at point b in FIG. 8 since the count value of the counter 433 is 0 because the counter was reset. The counter value of the counter 433 coincides with the previous count value at point c in FIG. 8 because the count value is 1. When these count values coincide, a signal 402 is set to "1" and information to be recorded is transferred from the RAM 313 to the recording circuit 410 and record into the card. Although the signal 402 is connected in the recording circuit 410 in FIG. 7, this signal is used as a record allowance signal of a modulator 413.

The writing operation in the same track is finished by the foregoing operations. Next, a varification and the like of the recorded information are executed. However, since these processes have already been described, they are omitted here.

In the embodiment, the recording position is controlled on the basis of the number of pulses of the encoder. Therefore, when a directory is written, it can be also recorded when the card is fed from the point a in FIG. 7 in the direction opposite to the F direction, thereby enabling a high processing speed to be realized.

I claim:

1. An information recording apparatus for recording information on a recording medium including a plurality of information recording tracks each of which is not physically divided into a plurality of areas, said apparatus comprising:

first output means for outputting data to be recorded on the information recording tracks;

second output means for outputting directory information units for managing the data output by said first output means;

recording means for recording on the information recording tracks both the data output by said first output means and the directory information units output by said second output means;

detecting means for detecting the number of the directory information units recorded on a single information recording track; and control means for controlling a position on which directory information is to be recorded on the basis of the number of the directory information units detected by said detecting means;

wherein said control means directs said recording means to record a directory information unit at a position spaced a predetermined distance from a directory information unit previously recorded on the recording medium.

2. An apparatus according to claim 1, wherein said detecting means counts the number of directory information units recorded on a single track.

3. An apparatus according to claim 1, wherein said detecting means counts the number of spaces among said directory information recorded on a single track.

4. An apparatus according to claim 1, wherein the directory information unit includes address information indicating which information recording track the data output from said first output means has been stored in.

5. An apparatus according to claim 1, wherein, when the number of the directory information units recorded in a single track is less than a predetermined number, said control means causes said recording means to record a directory information unit in the track.

6. An apparatus according to claim 5, wherein said control means causes said detecting means to scan the track, and causes said recording means to record the directory information unit after setting the predetermined distance when the number of the directory information units in the track detected during the scanning operation coincides with a predetermined number.

7. An apparatus according to claim 1, wherein when the number of the directory information units recorded in a single track is a predetermined number, said control means causes said recording means to record the directory information in a different track.

8. An apparatus according to claim 7, wherein said control means causes said recording means to record the directory information unit at the head of the different track.

9. An apparatus according to claim 1, wherein said control means, after directing said recording means to record the directory information unit, reproduces the recorded directory information unit and detects whether or not an error is present.

10. An apparatus according to claim 1, further comprising driving means for driving the recording medium, generating means for generating a synchro signal which is in synchronized with the operation of said driving means, and counting means for counting the synchro signal, wherein said control means causes said recording means to produce the predetermined distance on the basis of the output of said counting means.

11. An apparatus according to claim 1, wherein said recording means records data by reciprocating the recording medium.

12. An apparatus according to claim 1 wherein the recording medium has a card-like shape.

* * * * *

UNITED STATES PATENT AND TRADEMARK OFFICE
CERTIFICATE OF CORRECTION

PATENT NO. : 4,868,806

DATED : September 19, 1989

INVENTOR(S) : Wataru Sakagami

It is certified that error appears in the above-identified patent and that said Letters Patent is hereby corrected as shown below:

IN THE DRAWINGS

Figure 5:
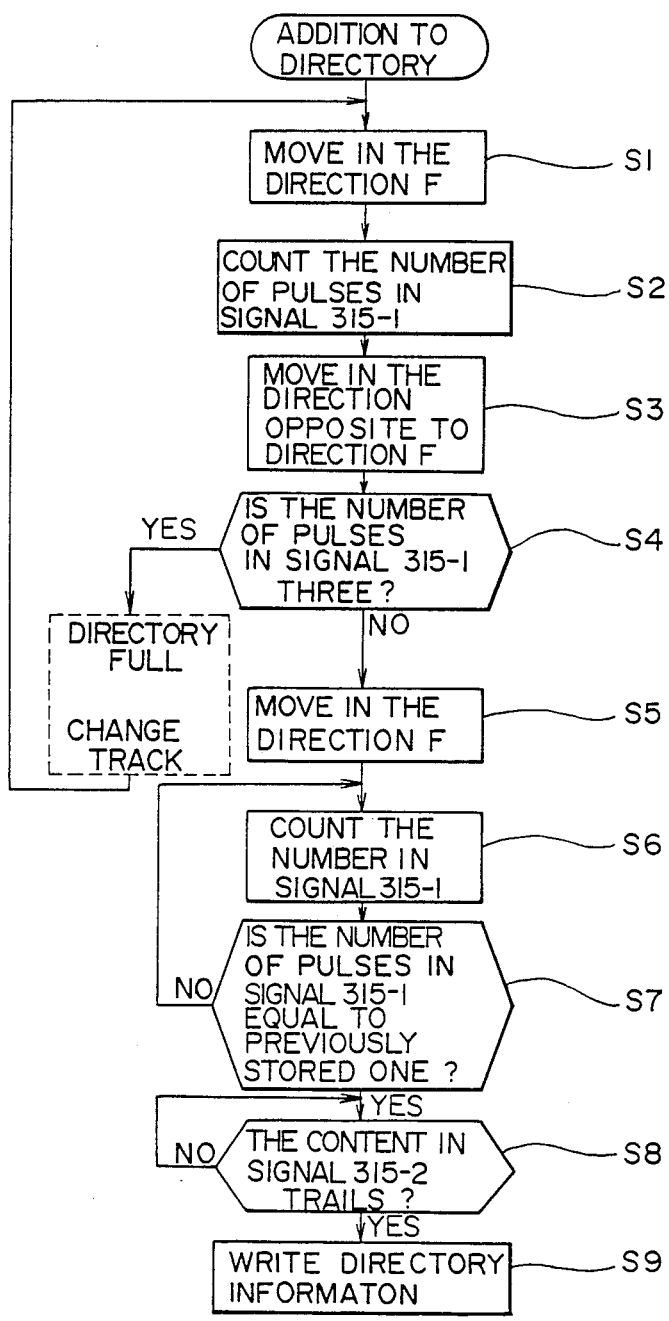
FIG. 5 is a flowchart showing the control operation when a directory is recorded.

FIG. 5, in logic block, "INFORMATON" should read --INFORMATION--.

COLUMN 2

Line 39, "directory" should read --a directory--.

COLUMN 3

Line 29, "cotnrols" should read --controls--.
Line 41, "MODE 305-2" should read --MODEM 305-2--.
Line 58, "very" should read --much--.
Line 61, "vain" should read --void--.

COLUMN 4

Line 18, "corded." should read --corded).--.
Line 36, "ca" should read --can--.
Line 57, "was" should read --is--.

UNITED STATES PATENT AND TRADEMARK OFFICE
CERTIFICATE OF CORRECTION

PATENT NO. : 4,868,806

DATED : September 19, 1989

INVENTOR(S) : Wataru Sakagami

It is certified that error appears in the above-identified patent and that said Letters Patent is hereby corrected as shown below:

COLUMN 5

Line 10, "was" should read --is--.
    Line 23, "312e," should read --321e,--.
    Line 56, "on" should read --one--.

COLUMN 6

Line 34, "record" should read --is recorded--.
    Line 39, "a varification" should read --verification--.

COLUMN 8

Line 20, "in" should be deleted.

Signed and Sealed this

Tenth Day of December, 1991

*Attest:*

HARRY F. MANBECK, JR.

*Attesting Officer*      *Commissioner of Patents and Trademarks*